United States Patent [19]

Utts et al.

[11] Patent Number: 4,772,792
[45] Date of Patent: Sep. 20, 1988

[54] PULSER STABILIZED RADIATION DETECTOR

[75] Inventors: Bradley K. Utts, Oakwood Village; Frank M. Sparacia, Solon; Oley D. Wimer, Hudson, all of Ohio

[73] Assignee: Harshaw/Filtrol Partnership, Cleveland, Ohio

[21] Appl. No.: 690,430

[22] Filed: Jan. 10, 1985

[51] Int. Cl.$^4$ ............................................. G01T 1/202
[52] U.S. Cl. .................................. 250/366; 250/252.1; 250/367; 250/369; 250/486.1
[58] Field of Search ...................... 250/369, 252.1, 367, 250/363 R, 366, 486.1

[56] References Cited

U.S. PATENT DOCUMENTS

| | | | |
|---|---|---|---|
| 3,030,509 | 4/1962 | Carlson | 250/363 R |
| 4,053,767 | 10/1977 | Kampfer et al. | 250/367 |
| 4,450,354 | 5/1984 | Smith, Jr. et al. | 250/369 |

OTHER PUBLICATIONS

Chupp et al, "Onboard Calibration System for X-Ray Spectrometers in Space Satellites; 15th Nuclear Science Symposium, Montreal, Canada, Oct. 1968.

Lucas et al, "A Stabilized Scintillation Crystal System for Monitoring Gamma Ray Exposure in the Environment", IEEE Trans. Nucl. Sci., NS-23 (1), Feb. 1976, pp. 699-703.

Tsoulfanidis, "Measurement and Detection of Radiation", McGraw-Hill, N.Y., 1981, p. 214.

Primary Examiner—Carolyn E. Fields
Attorney, Agent, or Firm—Harshaw/Filtrol Partnership

[57] ABSTRACT

A radiation detector useful for well logging and other applications contains a stabilizing pulsar device comprising a scintillator coupled to a photodetector and including a radio-active source such as an Am$^{241}$ which simultaneously emits gamma rays and low energy particles such as $\alpha$ or $\beta$ particles upon decay. The pulsar device is coupled to the radiation detector which utilizes a scintillation crystal and photodetector, and the outputs from the two photodetectors are processed through a coincident/anti-coincident gate alternately to stabilize the gamma rays or to read the environmentally induced radiation.

6 Claims, 2 Drawing Sheets

PULSER STABILIZED RADIATION DETECTOR

BACKGROUND OF THE INVENTION

1. Field of the Invention

This invention relates to a radiation detection device, particularly an inorganic scintillation crystal which is optically coupled to a photomultiplier tube (PMT) and which emits detectable light in response to exposure to ionizing radiation. More particularly the invention relates to the use of a radioactive pulser embedded in a second crystal coupled to a second PMT to provide stabilization for the detector device. Such detector devices find use in various industrial and research applications including well logging, high energy physics, aircraft exploration, and the like.

2. Description of Related Art

Devices for detecting and measuring radiation energy have been known for many years. One type of device which is in common use is the scintillation phosphor which employs a substance having the ability to convert ionizing radiation energy into light energy. Such a phosphor is typically coupled to a photomultiplier tube or a photodiode which converts the light energy into an electrical pulse or current. This current is further amplified and is electronically processed to provide useful data concerning the type, strength and other characteristics of the radiation energy.

A number of naturally occurring and synthetically produced materials have been found to possess the property of converting ionizing radiation energy into pulses of light. Among these are organic substances such as anthracene, various synthetic plastics, and naturally occurring as well as doped inorganic crystals such as bismuth germanate, calcium and cadmium tungstate, sodium iodide doped with thallium and calcium fluoride doped with europium.

The most common types of ionizing radiation are gamma or X-rays, alpha particles and beta particles (electrons), having energies ranging from a few thousand electron volts (Kev) to several million volts (Mev).

The different types of scintillators have widely varying characteristics such as density, decay constant, scintillation efficiency, physical strength, hygroscopicity, etc. The pulses of light emitted during scintillation events generally are proportional to the energy deposited in the phosphor. These pulses are detected and counted by a photodetector such as a photomultiplier tube or a photodiode, the latter being used where a strong magnetic field is present, when space is a constraint, or where high energy radiation is being measured and background noise is not a serious problem. Each photomultiplier tube has its own characteristics and it is essential that the right tube be selected for the intended end use application. The current output of the photomultiplier tube is subject to certain variables which necessitate the use of a calibrating standard. Among the variables are temperature, aging or failure of the electronic and other parts, and fluctuations in the power supply.

Prior efforts to stabilize scintillation detectors have involved the use of a flashing light source, an alpha emitting radioactive source such as $Am^{241}$ adjacent the scintillator at a point opposite the photodetector, or an alpha source distributed throughout the scintillation crystal. Yet another approach has been to incorporate the radioactive source into a reference crystal to form a pulser, and coupling the pulser to the scintillation crystal opposite the photodetector, as shown in U.S. Pat. No. 3,030,509 dated Apr. 17, 1962. These attempts at standardization all have had drawbacks including thermal instability, low and variable alpha counting efficiency, the need to provide external light sources, etc.

BRIEF DESCRIPTION OF THE INVENTION

This invention relates to a novel pulser device, useful for the stabilization of a scintillation radiation detector, and to a novel detector assembly which includes said pulser device.

The radiation detector comprises a first scintillation crystal encased in a housing and optically coupled to a first photodetector such as a photomultiplier tube. The housing at the rear of the crystal opposite said photodetector is adapted to receive a stabilizing pulser device.

The stabilizing pulser device comprises a second inorganic scintillator, a photodetector such as a photomultiplier tube optically coupled to said scintillator, and a radioactive pulser which simultaneously emits two separate particles of energy including a gamma ray and an $\alpha$ or $\beta$ particle. The radioactive source is positioned so that the second scintillator interacts with substantially all of the $\alpha$ or $\beta$ particles and all of the gamma rays emitted in the direction of the pulser photodetector, but does not interact with the gamma rays emitted in the opposite direction toward said radiation detector. Thus, these gamma rays pass through the housing of the detector and interact with the first scintillation crystal.

The scintillator used with the pulser comprises a front crystal optically coupled to the photodetector and a rear crystal of the same material, said crystals optically coupled to one another along closely conforming polished mating surfaces. The radioactive source is located in the space between said mating surfaces.

The outputs from the two photodetectors are simultaneously transmitted to a gating circuit which processes the two signals in either a coincident or an anti-coincident mode. The coincident mode is used for purposes of calibrating the radiation detector by comparing the signal pulse through the first detector with the pulse obtained from the second detector coupled to the pulser crystal. In the anti-coincident mode, the gate passes the environmental signal from the first detector and effectively filters out the signal from the pulser in a manner to be hereinafter described in more detail.

DETAILED DESCRIPTION OF THE INVENTION

Figure 1:
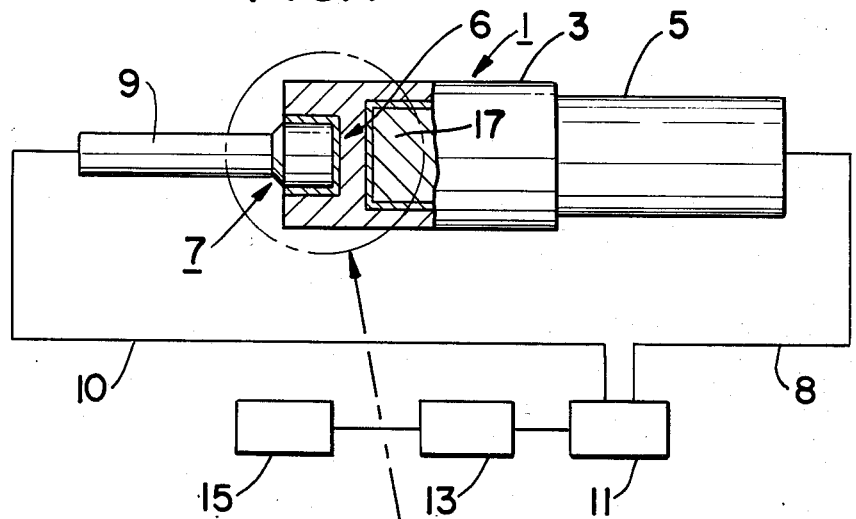
FIG. 1 is a schematic arrangement, partially in cross-sections, of a radiation detector device embodying the operating principles of the present invention.

Referring now to the drawings, FIG. 1 is a schematic arrangement of a device 1 for detecting environmentally occurring ionizing radiation, said device stabilized with a novel pulser. The device includes a crystal housing 3 containing an inorganic scintillation crystal 17, and a photomultiplier tube 5 optically coupled to the crystal. In this embodiment, the crystal housing contains a well 6 opposite the photomultiplier tube, and in the well is the pulser assembly 7 optically coupled to a second photomultiplier tube 9. The outputs 8 and 10 from the two photomultiplier tubes go to a signal processor shown generally as a gate 11, an amplifier 13, and an analyzer 15.

Figure 2:
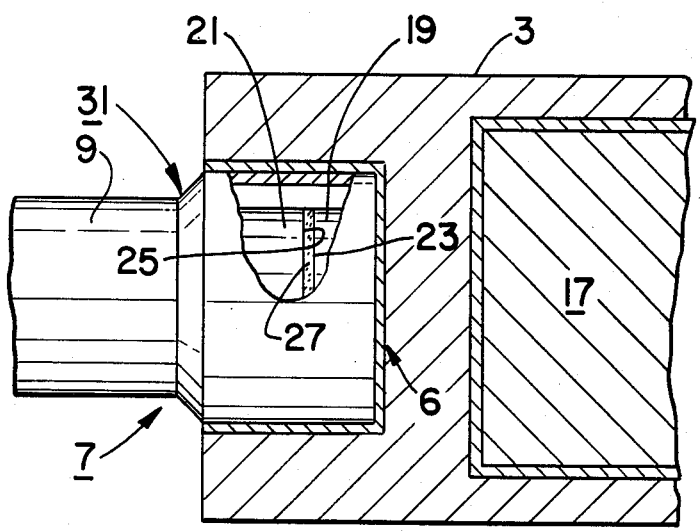
FIG. 2 is an enlarged, detailed view of the area 2 shown in FIG. 1.

Referring now to FIG. 2, the pulser assembly 7 is positioned in the well 6 of the crystal housing 3 and is secured in place by appropriate means such as welding, cementing, or the use of flanges. The assembly comprises an inorganic scintillator which, in a preferred embodiment consists of a rear scintillation crystal 19 and a front scintillation crystal 21 having opposed, polished mating surfaces 23, 25 and a thin layer 27 of a radioactive dopant such as $Am^{241}$ interposed between the polished surfaces. The front crystal 21 is optically coupled to the photomultiplier tube 9, using a suitable coupling material such as silicone grease. The entire pulser assembly is enclosed in a housing 31, the details of which are shown in FIG. 3.

The detector housing 3 contains a scintillation crystal 17 of the type commonly used for the detection of ionizing radiation. Examples are thallium activated sodium iodide or cesium iodide, sodium activated calcium iodide or various self activated scintillators such as bismuth germanate, calcium tungstate, cadmium tungstate and barium fluoride.

Figure 3:
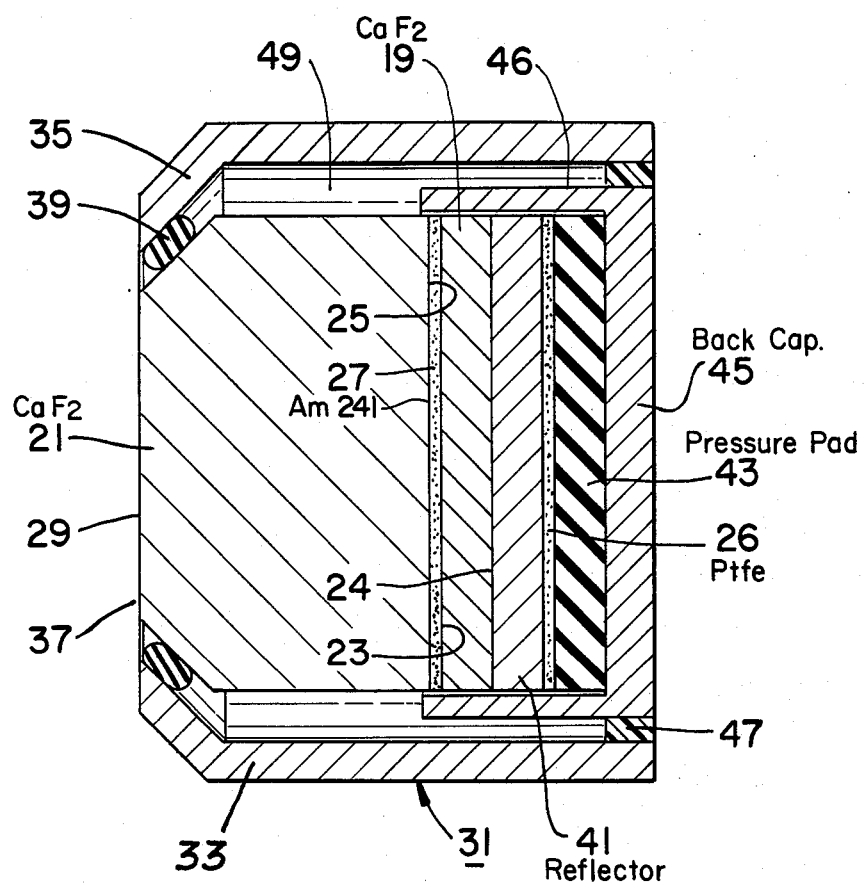
FIG. 3 is a cross-sectional view of a pulser useful in the present invention.

In FIG. 3, the housing 31 comprises a cylindrical can 33 of aluminum or the like with a frustro-conical section 35 terminating in opening 37. The front crystal 21 fits into the can 33 in abutting contact with a suitably positioned O-ring 39 or other elastomeric or resinous material. A thin layer of the $Am^{241}$ is deposited, for example by evaporation from a solution of $Am^{241}Cl$, on the polished surface 25 of the front crystal 21, or alternatively on the polished surface 23 of back crystal 19. In any event, the two polished surfaces are in intimate contact with one another with the layer 27 of $Am^{241}$ sandwiched therebetween. The use of an air interface between the two polished surfaces to optically couple the two crystals insures an extremely high alpha particle transmission efficiency. The use of a glue or other binder at the interface is avoided inasmuch as it undesirably decreases transmission efficiency due to the absorption of alpha particles by the binder. The rear crystal 19 is sufficiently thin so as not to impede the transmission of X-rays therethrough. In the case of calcium fluoride doped with europium, a thickness of 1/16" to ⅛" is adequate to stop the passage of low energy alpha particles emitted by the $Am^{241}$, while permitting the 60 Kev gamma rays to pass through into the crystal 17 of the radiation detector.

A reflector 41, comprised of a suitable reflective material such as aluminum oxide or magnesium oxide in a silicon matrix, is held in contact with the back crystal 19 by a compressible pressure pad 43 made of foam rubber or synthetic elastomer or the like. The entire crystal assembly is positioned within the housing 31 by a cup shaped end cap 45, the wall 46 of said cap extending into the annular space 49 between the crystals and the housing 31. One or more thin pads 26 of polytetrafluoroethylene or other suitable inert plastic are used as shims to insure proper alignment and fit of the crystals and other component parts within the housing. The end cap 45 is secured to the housing using an epoxy resin 47 or other suitable adhesive.

Although the pulser assembly 7 has a reflector 41 on the surface of the rear crystal 19 opposite the photomultiplier tube, there is no corresponding reflective layer in the annular space 49 between the sides of the pulser crystals and the housing 31. The cylindrical and frustro-conical sides of the front crystal 21, as well as the unpolished surfaces of the back crystal 19 are sanded or are otherwise treated to give a highly diffuse surface. This diffuse surface, and the absence of reflective material around the crystals, cooperate to prevent the undesirable formation of a double peaak in the gamma ray spectrum. As a scintillation event occurs in the rear crystal 19, it loses a certain amount of light or energy as it passes through the air interface between the two crystals and reaches the PMT with reduced intensity. By not using reflective material around the front crystal, the intensity of events occurring in the front crystal are equalized with those of the rear crystal, thereby avoiding the formation of two separate energy peaks.

In operation, the detector assembly 1 is placed in an environment in which radiation levels and types are to be quantified and identified. A typical application would be a well logging operation wherein the detector is lowered into a well hole and the environmental radiation from earth formation is recorded with possible oil-bearing strata being located and characterized.

When logging data is being collected and processed, the gate 11 (shown in FIG. 1) is in the anti-coincident mode allowing only the environmental signals to be passed through the amplifier and the signal processor, while filtering out the gamma signals emanating from the $Am^{241}$ radiation source. In this event, the radiation spectrum does not contain the 60 Kev stabilization peak.

When it is desired to calibrate the system, the gate 11 is switched to the coincident mode whereupon it passes signals only if they are received from the output of both photomultiplier tubes. As previously mentioned, the $Am^{241}$ simultaneously emits an alpha particle with a 5.4 Mev peak and a gamma ray having a 60 Kev peak. The relatively low energy alpha particles are stopped with a high degree of efficiency, exceeding 98%, in the $CaF_2$(Eu) crystal and never reach the scintillation crystal 17 in the detector. Thus an event involving an $\alpha$ particle interaction is recorded in the pulser photomultiplier tube 9, but no such event is seen or recorded in the crystal 17 and is not transmitted through the photomultiplier tube 7 to the gate. Absent a coinciding event from both tubes, the alpha particle interaction is not a recorded event since it does not pass the gate.

On the other hand, the 60 Kev gamma rays emitted simultaneously with the alpha particle enter the front pulser crystal 21 where they generate scintillation events that are recorded by the PMT 9 sending a separate signal to the gate. Additional gamma rays pass through the back crystal 19 which is sufficiently thin so as not to impede their transmission, and enter the main detector crystal 17 where they interact with the crystal and generate a signal denoting an ionization event within the crystal. This signal is detected by the PMT 7 and is relayed to the gate, where it coincides with the signal from the pulser resulting in a coincident signal having a known pulse height. This signal is then fed into a logic circuit which electronically adjusts the position of the photopeak from the detector crystal thereby stabilizing the radiation crystal 17 and the electronics of the detector 7.

In a preferred embodiment of the invention, $CaF_2$(Eu) and $Am^{241}$ are used in the construction of the pulser. $CaF_2$(Eu) is an excellent detector for charged particles, even in the low energy range of a few keV. This inorganic crystal is hard, inert and non-hygroscopic. It has good resistance to thermal and mechanical shock and can be fabricated into a variety of detector geometries. It has a wavelength of maximum emission of 435 nm and a decay constant of 0.94 microseconds. The index of refraction, at 435 nm is 1.44 and its density is 3.19.

$Am^{241}$ is an excellent radioactive source for the present invention because of the simultaneous emission of an α particle having a low energy of 5.48 keV and a gamma ray having an energy of 60 Kev with a count rate of 50–2000 counts per second. The $Am^{241}$ is deposited on the polished surface of the crystal from a solution of $Am^{241}Cl$.

Although the pulser has been described in the context of an $Am^{241}$ source sandwiched between two crystals of $CaF_2(Eu)$, other materials may be used in the pulser without departing from the teachings of the present invention. The use of $CaF_2(Eu)$ and $Am^{241}$ has several advantages including the following: (a) The pulser is stable over a wide temperature range between −55° C. and 150° C.; (b) $CaF_2(Eu)$ is non-hygroscopic thereby eliminating the necessity of assembling the pulser in a drybox, and providing a vapor free or airtight container for the crystals; (c) The pulser has an alpha particle detection efficiency greater than 98%; and (d) The arrangement of the pulser within the housing, and the strategic location of reflective and diffuse surfaces within the housing result in the production of a single, easily identified photopeak.

Although $CaF_2(Eu)$ is a preferred scintillation crystal of the present invention, other non-hygroscopic crystals having a low index of refraction can be used instead. Examples are CsI (Tl) and $BaF_2$. As previously mentioned, the low index permits air coupling between the polished surfaces of the two crystals, thereby minimizing the loss of alpha particle emission into the coupling medium. However, as previously mentioned, because of its combination of non-hygroscopicity, low index of refraction and relatively high conversion efficiency, $CaF_2(Eu)$ is the preferred scintillator.

Other radioactive sources having simultaneous emissions of gamma rays and alpha or beta particles may be used in place of $Am^{241}$. One such example is $cobalt^{60}$ which simultaneously emits two gamma rays having energies of 1.17 and 1.33 Mev and a β particle with an energy of 320 Kev. The stopping power of the pulser crystal is much less for β particles than it is for α particles. For this reason, the two crystals preferably are reversed so that the back crystal is sufficiently thick to stop the particles and prevent them from reaching the scintillation crystal of the environmental detector while the thickness of the front crystal is not critical.

The housing of the environmental detector need not be provided with a well to house the pulser. Instead, the pulser, packaged with suitable electronics, can be used as a probe, adapted to be brought into close proximity to the environmental detector to stabilize the same. In fact, it could be used to simultaneously stabilize two or more detectors. Alternatively, the pulser may be permanently attached to the housing by welding or the like. The use of flanges on the housings of the detectors permits rapid coupling/decoupling where portability and/or interchangability are desired.

Other variations can be made in the teachings of the present invention without departing from the concept of providing a pulser which automatically compensates for temperature and photomultiplier gain in both the scintillation crystal and the photomultiplier tube by providing a constant pulse height for stabilization. For example, the size and shape of the scintillator used for the pulser, as well as the distribution of radioactive material within the pulser can be varied without departing from the invention. The radioactive source can be a point source, several point sources or a diffused source deposited within a unitary pulser crystal by appropriate means.

We claim:

1. A stabilizing pulser for radiation detectors comprising:
   (a) an inorganic scintillator composed of a first and a second scintillation crystal of the same material optically coupled to one another along closely conforming mating surfaces;
   (b) a photo detector optically coupled to said first scintillation crystal, and
   (c) a radioactive source which simultaneously emits a gamma ray and an α or β particle, said radioactive source being positioned between the two scintillation crystals along their mating surfaces so that the first scintillation crystal interacts with substantially all of the particles and the gamma rays emitted in the direction of the photo detector and the second scintillation crystal interacts with substantially all of the particles entering said second crystal while permitting the gamma rays to pass therethrough.

2. The pulser of claim 1 wherein the radioactive source is $Am^{241}$ capable of simultaneously emitting an alpha particle having an energy of 5.48 Mev and a gamma ray having an energy of 60 Kev.

3. The pulser device of claim 1 wherein the scintillation crystals are composed of $CaF_2(Eu)$.

4. A stabilized radiation detector device comprising:
   (a) An environmental detector comprising a first scintillation crystal, one surface of which is optically coupled to a first photomultiplier tube, and
   (b) A pulser assembly in proximity to the second surface of the first scintillation crystal generally remote from the first photomultiplier tube, said pulser assembly comprising:
      (1) A radioactive source which simultaneously emits two particles of energy, one being a gamma ray and the other being an alpha or a beta particle,
      (2) A non-hygroscopic inorganic scintillation crystal surrounding said radiation source so as to interact with the α or β particle while permitting the portion of the gamma rays emitted in the direction of the environmental detector to pass into the first scintillation crystal; and
      (3) A second photomultiplier tube optically coupled to said non-hygroscopic scintillation crystal; and
   (c) A gating circuit coupled to the output of the first photomultiplier tube and the second photomultiplier tube, said circuit having a coincident mode wherein it compares the signal from the environmental detector with the signal from the pulser generated by the interaction of the gamma ray emission with the inorganic scintillation crystal to standardize the environmental detector, and said circuit having an anti-coincident mode when it passes through the signals resulting from events produced by interactions between environmental sources and the first scintillation crystal without interference with the stabilizing signal.

5. The detector device of claim 4 wherein $Am^{241}$ is the radioactive source used as the pulser.

6. The radiation detector of claim 5 wherein the non-hygroscopic inorganic scintillation crystal used with the pulser is $CaF_2(Eu)$.

* * * * *